United States Patent
Liu et al.

(10) Patent No.: US 11,582,800 B2
(45) Date of Patent: Feb. 14, 2023

(54) CONTENTION WINDOW ADJUSTMENT FOR GROUP CHANNEL OCCUPANCY TIME SHARING

(71) Applicant: QUALCOMM Incorporated, San Diego, CA (US)

(72) Inventors: Chih-Hao Liu, San Diego, CA (US); Aleksandar Damnjanovic, Del Mar, CA (US); Jing Sun, San Diego, CA (US); Yisheng Xue, San Diego, CA (US); Xiaoxia Zhang, San Diego, CA (US); Ozcan Ozturk, San Diego, CA (US); Rajat Prakash, San Diego, CA (US); Juan Montojo, San Diego, CA (US); Tao Luo, San Diego, CA (US); Peter Gaal, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 74 days.

(21) Appl. No.: 17/143,825

(22) Filed: Jan. 7, 2021

(65) Prior Publication Data
US 2022/0217771 A1 Jul. 7, 2022

(51) Int. Cl.
| H04B 7/00 | (2006.01) |
| H04W 74/08 | (2009.01) |
| H04L 5/16 | (2006.01) |
| H04W 72/04 | (2023.01) |
| H04W 72/044 | (2023.01) |

(52) U.S. Cl.
CPC ........... *H04W 74/0808* (2013.01); *H04L 5/16* (2013.01); *H04W 72/042* (2013.01); *H04W 72/044* (2013.01)

(58) Field of Classification Search
CPC ........... H04W 74/0808; H04W 72/042; H04W 72/044; H04L 5/16; H04L 5/0053; H04L 5/00
See application file for complete search history.

(56) References Cited

U.S. PATENT DOCUMENTS

| 2017/0019909 A1* | 1/2017 | Si ........................ H04W 76/28 |
| 2018/0227088 A1* | 8/2018 | Bhattad ................ H04L 1/1832 |
| 2019/0159256 A1* | 5/2019 | Talarico .................. H04L 1/187 |
| 2020/0106588 A1* | 4/2020 | Gulati .................... H04L 1/0033 |
| 2020/0344819 A1* | 10/2020 | Myung ............. H04W 74/0841 |
| 2020/0374933 A1* | 11/2020 | Lou .................... H04W 74/0833 |
| 2020/0396718 A1* | 12/2020 | Luo .................... H04W 72/0446 |
| 2021/0105842 A1* | 4/2021 | Cheng ..................... H04W 4/40 |
| 2021/0176626 A1* | 6/2021 | Abdelghaffar ........ H04W 80/02 |
| 2021/0204322 A1* | 7/2021 | Lou .................... H04W 74/0816 |

(Continued)

*Primary Examiner* — Abdelnabi O Musa
(74) *Attorney, Agent, or Firm* — Harrity & Harrity, LLP

(57) ABSTRACT

Various aspects of the present disclosure generally relate to wireless communication. In some aspects, a user equipment (UE) may determine an adjusted contention window size for a listen-before-talk (LBT) procedure that increases channel access time fairness between a plurality of different groups of UEs. The UE may determine, via the LBT procedure, that a channel is idle based at least in part on the adjusted contention window size. The UE may transmit, to other UEs in a group of UEs that includes the UE, control information that enables a group channel occupancy time (COT) associated with the channel to be shared with the other UEs in the group of UEs. Numerous other aspects are described.

30 Claims, 11 Drawing Sheets

(56) References Cited

U.S. PATENT DOCUMENTS

| | | | |
|---|---|---|---|
| 2021/0274553 A1* | 9/2021 | Xue | H04W 74/0825 |
| 2021/0298075 A1* | 9/2021 | Talarico | H04W 72/042 |
| 2022/0030612 A1* | 1/2022 | Balasubramanian | H04L 5/16 |
| 2022/0104259 A1* | 3/2022 | Li | H04W 74/0816 |

* cited by examiner

| Class | $p_0$ | $CW_{min}$ | $CW_{max}$ | Maximum COT |
|---|---|---|---|---|
| 4 | 2 | 3 | 7 | 2 ms |
| 3 | 2 | 7 | 15 | 4 ms |
| 2 | 3 | 15 | 1023 | 6 ms |
| 1 | 7 | 15 | 1023 | 6 ms |

FIG. 5

CONTENTION WINDOW ADJUSTMENT FOR GROUP CHANNEL OCCUPANCY TIME SHARING

FIELD OF THE DISCLOSURE

Aspects of the present disclosure generally relate to wireless communication and to techniques and apparatuses for contention window adjustment for group channel occupancy time (COT) sharing.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a user equipment (UE) for wireless communication includes a memory; and one or more processors operatively coupled to the memory, the memory and the one or more processors configured to: determine an adjusted contention window size for a listen-before-talk (LBT) procedure that increases channel access time fairness between a plurality of different groups of UEs; determine, via the LBT procedure, that a channel is idle based at least in part on the adjusted contention window size; and transmit, to other UEs in a group of UEs that includes the UE, control information that enables a group channel occupancy time (COT) associated with the channel to be shared with the other UEs in the group of UEs, and wherein the plurality of different groups of UEs correspond to different groups of COT sharing UEs.

In some aspects, a method of wireless communication performed by a UE includes determining an adjusted contention window size for an LBT procedure that increases channel access time fairness between a plurality of different groups of UEs; determining, via the LBT procedure, that a channel is idle based at least in part on the adjusted contention window size; and transmitting, to other UEs in a group of UEs that includes the UE, control information that enables a group COT associated with the channel to be shared with the other UEs in the group of UEs, and wherein the plurality of different groups of UEs correspond to different groups of COT sharing UEs.

In some aspects, a non-transitory computer-readable medium storing a set of instructions for wireless communication includes one or more instructions that, when executed by one or more processors of a UE, cause the UE to: determine an adjusted contention window size for an LBT procedure that increases channel access time fairness between a plurality of different groups of UEs; determine, via the LBT procedure, that a channel is idle based at least in part on the adjusted contention window size; and transmit, to other UEs in a group of UEs that includes the UE, control information that enables a group COT associated with the channel to be shared with the other UEs in the group of UEs, and wherein the plurality of different groups of UEs correspond to different groups of COT sharing UEs.

In some aspects, an apparatus for wireless communication includes means for determining an adjusted contention window size for an LBT procedure that increases channel access time fairness between a plurality of different groups of UEs; means for determining, via the LBT procedure, that a channel is idle based at least in part on the adjusted contention window size; and means for transmitting, to other UEs in a group of UEs that includes the apparatus, control information that enables a group COT associated with the channel to be shared with the other UEs in the group of UEs, and wherein the plurality of different groups of UEs correspond to different groups of COT sharing UEs.

In some aspects, a user equipment (UE) for wireless communication includes a memory; and one or more processors operatively coupled to the memory, the memory and the one or more processors configured to: receive, from other UEs in a group of UEs that includes the UE, control information that enables a group channel occupancy time (COT) associated with a channel to be shared with the other UEs in the group of UEs, wherein the group COT is shared with the other UEs based at least in part on an adjusted contention window size for a listen-before-talk procedure that increases channel access time fairness between a plurality of different groups of UEs, and wherein the plurality of different groups of UEs correspond to different groups of COT sharing UEs; and communicate with the other UEs in the group of UEs based at least in part on the control information that enables the group COT associated with the channel to be shared with the other UEs in the group of UEs.

In some aspects, a method of wireless communication performed by a UE includes receiving, from other UEs in a group of UEs that includes the UE, control information that enables a group channel occupancy time (COT) associated with a channel to be shared with the other UEs in the group of UEs, wherein the group COT is shared with the other UEs based at least in part on an adjusted contention window size for a listen-before-talk procedure that increases channel access time fairness between a plurality of different groups of UEs, and wherein the plurality of different groups of UEs correspond to different groups of COT sharing UEs; and communicating with the other UEs in the group of UEs based at least in part on the control information that enables the group COT associated with the channel to be shared with the other UEs in the group of UEs.

In some aspects, a non-transitory computer-readable medium storing a set of instructions for wireless communication includes one or more instructions that, when executed by one or more processors of a UE, cause the UE to: receive, from other UEs in a group of UEs that includes the UE, control information that enables a group channel occupancy time (COT) associated with a channel to be shared with the other UEs in the group of UEs, wherein the group COT is shared with the other UEs based at least in part on an adjusted contention window size for a listen-before-talk procedure that increases channel access time fairness between a plurality of different groups of UEs, and wherein the plurality of different groups of UEs correspond to different groups of COT sharing UEs; and communicate with the other UEs in the group of UEs based at least in part on the control information that enables the group COT associated with the channel to be shared with the other UEs in the group of UEs.

In some aspects, an apparatus for wireless communication includes means for receiving, from other UEs in a group of UEs that includes the UE, control information that enables a group channel occupancy time (COT) associated with a channel to be shared with the other UEs in the group of UEs, wherein the group COT is shared with the other UEs based at least in part on an adjusted contention window size for a listen-before-talk procedure that increases channel access time fairness between a plurality of different groups of UEs, and wherein the plurality of different groups of UEs correspond to different groups of COT sharing UEs; and communicating with the other UEs in the group of UEs based at least in part on the control information that enables the group COT associated with the channel to be shared with the other UEs in the group of UEs.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 5 is a diagram illustrating an example of channel access parameters, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
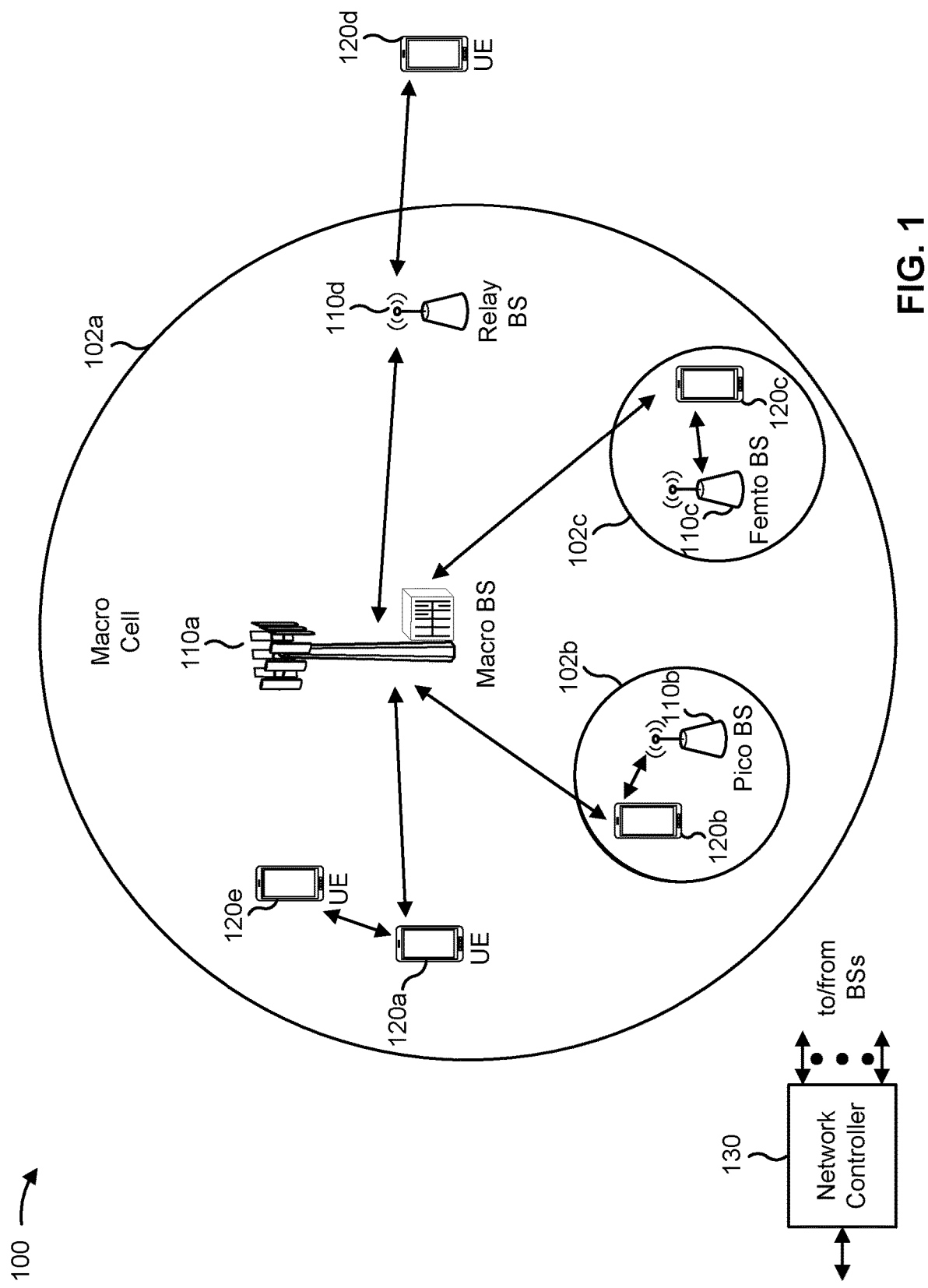
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
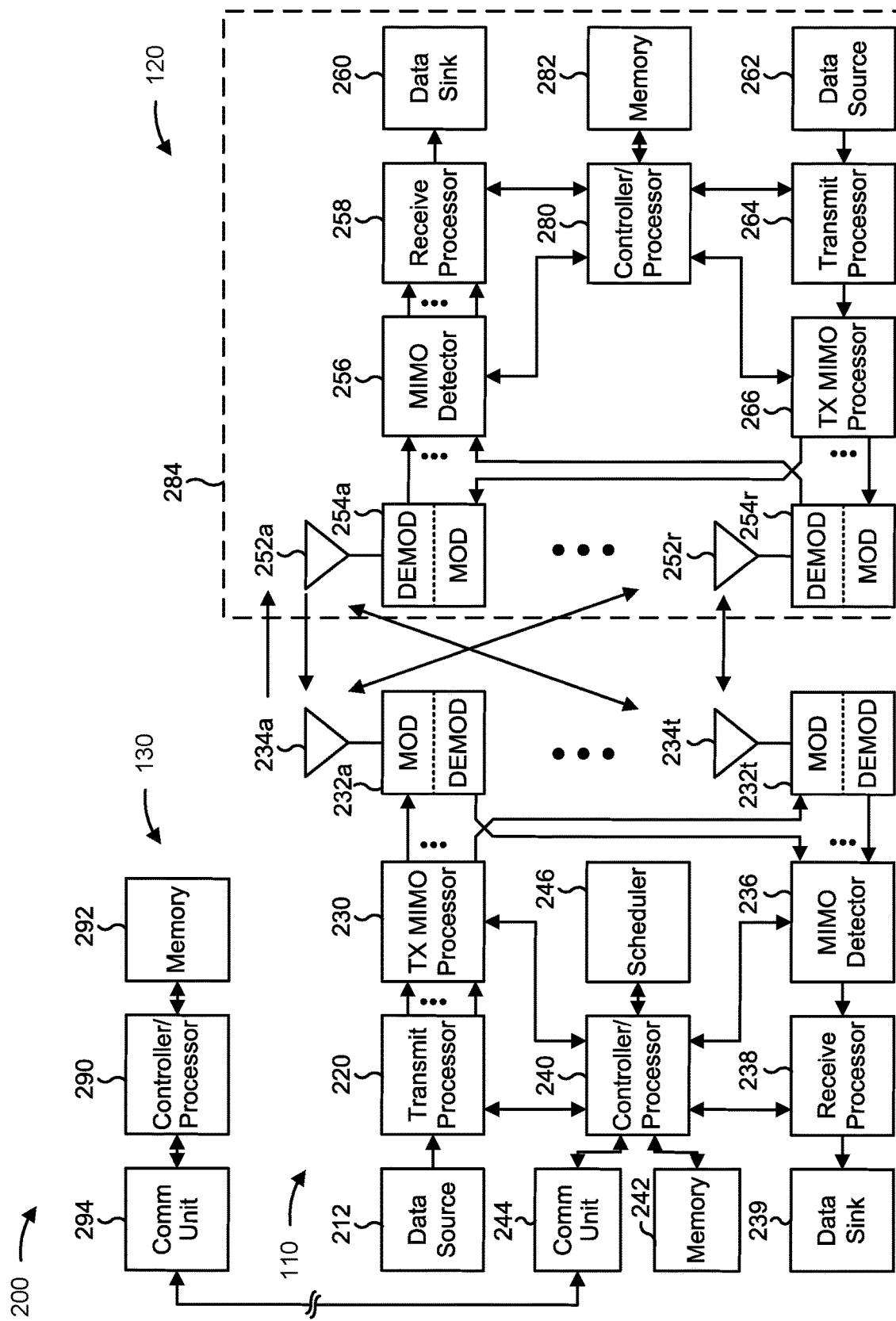
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234*a* through 234*t* and/or antennas 252*a* through 252*r*) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM) and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 7-8 and 10.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 7-8 and 10.

Controller/processor 240 of base station 110, controller/processor 280 of UE 120, and/or any other component(s) of FIG. 2 may perform one or more techniques associated with contention window adjustment for group COT sharing, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 1000 of FIG. 10, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 1000 of FIG. 10, and/or other processes as described herein. In some aspects, executing instructions may include running the instructions, converting the instructions, compiling the instructions, and/or interpreting the instructions, among other examples.

In some aspects, a UE (e.g., a sidelink UE) includes means for determining an adjusted contention window size for a listen-before-talk (LBT) procedure that increases channel access time fairness between a plurality of different groups of UEs; means for determining, via the LBT procedure, that a channel is idle based at least in part on the adjusted contention window size; or means for transmitting, to other UEs in a group of UEs that includes the UE, control information that enables a group COT associated with the channel to be shared with the other UEs in the group of UEs. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE includes means for determining the adjusted contention window size based at least in part on a quantity of UEs included in the group of UEs.

In some aspects, the UE includes means for determining the adjusted contention window size based at least in part on an area associated with the group of UEs.

In some aspects, the UE includes means for determining a radio frequency (RF) coverage area associated with the group of UEs based at least in part on one or more of: a demodulation reference signal strength associated with control information received via a control channel from the group of UEs, or a transmit beam width associated with transmitting group-sharing COT system information.

In some aspects, the UE includes means for determining, in a receive mode, the RF coverage area associated with the group of UEs during a remaining group COT region.

In some aspects, the UE includes means for determining the adjusted contention window size based at least in part on an amount of shareable time-frequency COT resources, and wherein the shareable time-frequency COT resources are configured to be shareable for the UE within the group of UEs.

In some aspects, the UE includes means for determining the adjusted contention window size based at least in part on determining an amount of unused shareable time-frequency COT resources based at least in part on an amount of used shareable time-frequency COT resources.

In some aspects, the UE includes means for determining, while operating in a listen mode, the amount of used shareable time-frequency COT resources in a remaining shared COT region based at least in part on decoding control information received from the other UEs in the group of UEs, wherein the control information includes an indication of a group identifier associated with the group of UEs.

In some aspects, the UE includes means for determining, while operating in a receive mode, the amount of used shareable time-frequency COT resources.

In some aspects, the UE includes means for determining the adjusted contention window size based at least in part on the UE successfully performing a transmission on shareable time-frequency resources associated with the group of UEs.

In some aspects, the UE includes means for reverting the adjusted contention window size to a previous contention window size based at least in part on an expiry of the timer.

In some aspects, the UE includes means for disabling a feature associated with determining the adjusted contention window size based at least in part on a non-detection of other groups of UEs, wherein the non-detection of the other groups of UEs is based at least in part on a non-detection of COT system information that indicates group COT sharing for another group identifier.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
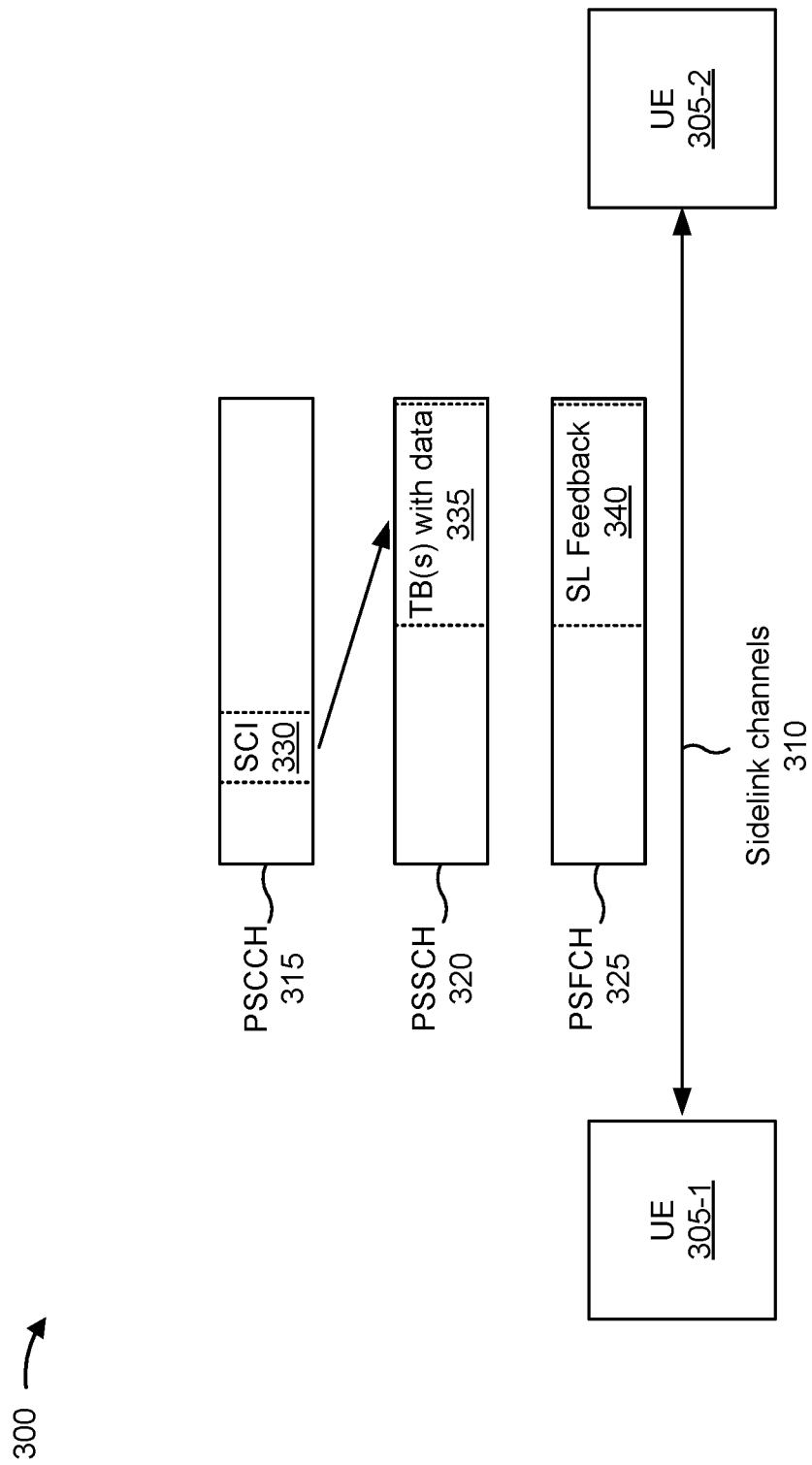
FIG. 3 is a diagram illustrating an example of sidelink communications, in accordance with various aspects of the present disclosure.

FIG. 3 is a diagram illustrating an example 300 of sidelink communications, in accordance with various aspects of the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or the like), mesh networking, and/or the like. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, symbols, and/or the like) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, spatial resources, and/or the like) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), a scheduling request (SR), and/or the like.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, may measure an RSRQ parameter (e.g., a PSSCH-RSRQ parameter) associated with various sidelink channels, and/or the like, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources, channel parameters, and/or the like. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, an MCS to be used for the upcoming sidelink transmission, and/or the like. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
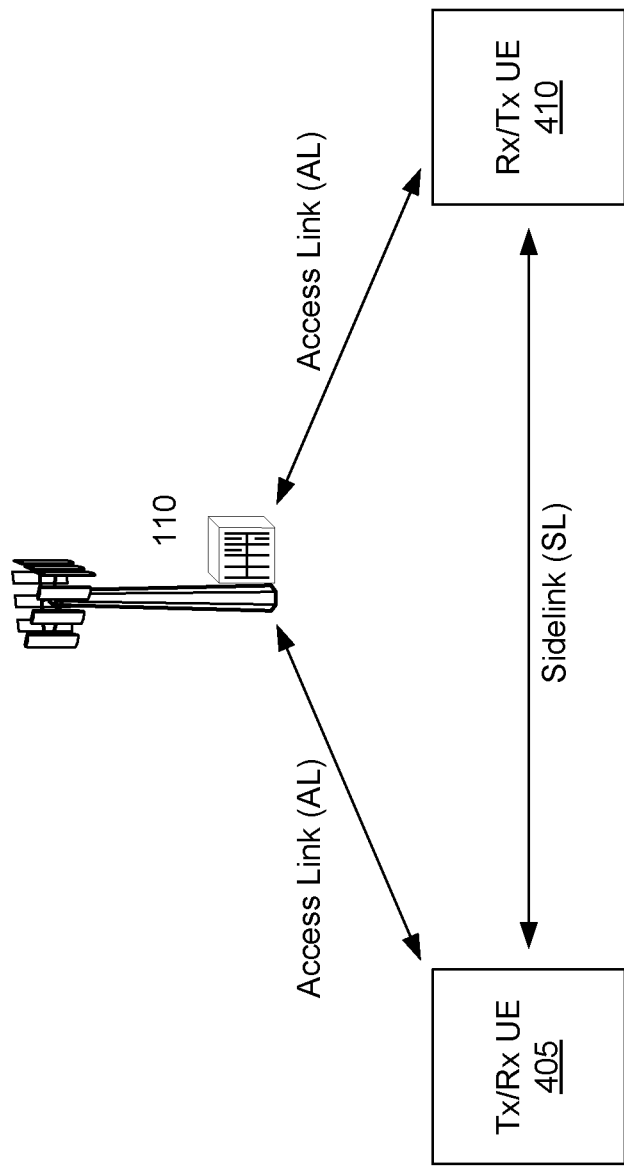
FIG. 4 is a diagram illustrating an example of sidelink communications and access link communications, in accordance with various aspects of the present disclosure.

FIG. 4 is a diagram illustrating an example 400 of sidelink communications and access link communications, in accordance with various aspects of the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

In a New Radio Unlicensed (NR-U) system, sidelink congestion control may suffer from poor performance for heavy-loaded or bursty traffic, such as enhanced mobile broadband (eMBB) traffic. In a dense deployment scenario, when numerous sidelink UEs attempt to access shared resources in an unlicensed spectrum, collisions may occur between the numerous sidelink UEs. The collisions may cause delays for the sidelink UEs, and thereby reduce a performance of the sidelink UEs.

A sidelink UE is likely to communicate with a certain group of UEs. In some cases, a sidelink UE may only communicate with a certain group of UEs. For example, in a gaming use case, a UE may communicate with a few other UEs when a user associated with the UE is playing an electronic game. As another example, in an industry use case, a sensor/actuator may communicate with a same group of sensors/actuators controlled by a same gateway.

Groups of sidelink UEs may be formed to alleviate congestion. Sidelink UEs in a group of sidelink UEs may share a COT with other sidelink UEs in the group. A sidelink UE may perform an LBT procedure and sense that a channel is idle. After the LBT procedure is performed and the sidelink UE senses that the channel is idle, the sidelink UE may obtain a COT with respect to that channel. The sidelink UE may share the COT with the other sidelink UEs in the group. In other words, the COT may be a group COT since the COT may be shared with the other sidelink UEs in the group.

A sidelink UE may transmit SCI to the other sidelink UEs in the group. The SCI may include a group identifier (ID), which may indicate the sidelink UEs in the group. The sidelink UE may share the COT with the sidelink UEs indicated by the group ID. The group ID may be configured via a radio resource control (RRC) configuration. The sidelink UE that transmits the SCI may share the COT with the other sidelink UEs in the group, and/or a sidelink UE that receives the SCI may share the COT with the other sidelink UEs in the group. The sidelink UE that shares the COT may forward group information to the other sidelink UEs in the group.

In some cases, a sidelink UE may be configured with a list of sidelink UE IDs. The sidelink UE IDs on the list may correspond to sidelink UE that are part of a same group as the sidelink UE. When the sidelink UE receives SCI, the sidelink UE may compare a source/destination ID associated with the SCI to the list of sidelink UE IDs, and determine whether the SCI is for sidelink UEs in the group. When the SCI is not for sidelink UEs in the group, the sidelink UE may not share a COT with a sender of the SCI.

Groups of sidelink UEs may be formed at an application level. For example, sidelink UEs in one service or sidelink UEs associated with a same operator/owner may form a group of sidelink UEs. A quantity of sidelink UEs in a group may be based at least in part on a determination made at a base station, and an indication of the quantity may be communicated to the sidelink UEs in the group.

The sidelink UE may perform the LBT procedure to ensure fair and friendly coexistence with other sidelink UEs operating in the unlicensed spectrum. A sidelink UE that is attempting to transmit on a carrier in the unlicensed spectrum may first perform the LBT procedure, which may involve the sidelink UE performing a clear channel assessment to determine if a channel is available for use. The LBT procedure may be a Category 1 (CAT 1) LBT procedure, a Category 2 (CAT 2) LBT procedure, a Category 3 (CAT 3) LBT procedure, or a Category 4 (CAT 4) LBT procedure.

In the CAT 1 LBT procedure, no LBT may be performed by a sidelink Tx UE. In the CAT 2 LBT procedure, LBT without a random back-off may be performed by the sidelink Tx UE. The sidelink Tx UE may perform a transmission after sensing the channel to be idle for at least a duration of time. In the CAT 3 LBT procedure, LBT with random back-off and with a contention window of a fixed size may be performed by the sidelink Tx UE. The sidelink Tx UE may select a random number within a contention window. A size of the contention window may be a fixed size and may be specified by a minimum contention window value and a maximum contention window value. In other words, the random number may be selected in between the minimum contention window value and the maximum contention window value. In the CAT 3 LBT procedure, the random number may be used to determine the duration of time that the channel is to be sensed to be idle, before the sidelink Tx UE is able to transmit on the channel.

In the CAT 4 LBT procedure, LBT with random back-off and with a contention window of a variable size may be performed by the sidelink Tx UE. The sidelink Tx UE may select a random number within a contention window. A size of the contention window may be based at least in part on a minimum contention window value and a maximum contention window value. The sidelink Tx UE may vary the size of the contention window when selecting the random number. The random number may be used to determine the duration of time that the channel is to be sensed to be idle, before the sidelink Tx UE is able to transmit on the channel.

FIG. 5 is a diagram illustrating an example 500 of channel access parameters, in accordance with various aspects of the present disclosure.

As shown in FIG. 5, for a given class number and a given priority number (Po), a minimum contention window value ($CW_{min}$), a maximum contention window value ($CW_{max}$), and a maximum COT (in ms) may be defined. The minimum contention window value, the maximum contention window value, and the maximum COT may be priority class dependent channel access parameters. For example, for class 4 and a priority of 2, $CW_{min}$ may be 3, $CW_{max}$ may be 7, and the maximum COT may be 2 ms. For class 3 and a priority of 2, $CW_{min}$ may be 7, $CW_{max}$ may be 15, and the maximum COT may be 4 ms. For class 2 and a priority of 3, $CW_{min}$ may be 15, $CW_{max}$ may be 1023, and the maximum COT may be 6 ms. For class 1 and a priority of 7, $CW_{min}$ may be 15, $CW_{max}$ may be 1023, and the maximum COT may be 6 ms.

As indicated above, FIG. 5 is provided as an example. Other examples may differ from what is described with regard to FIG. 5.

Figure 6:
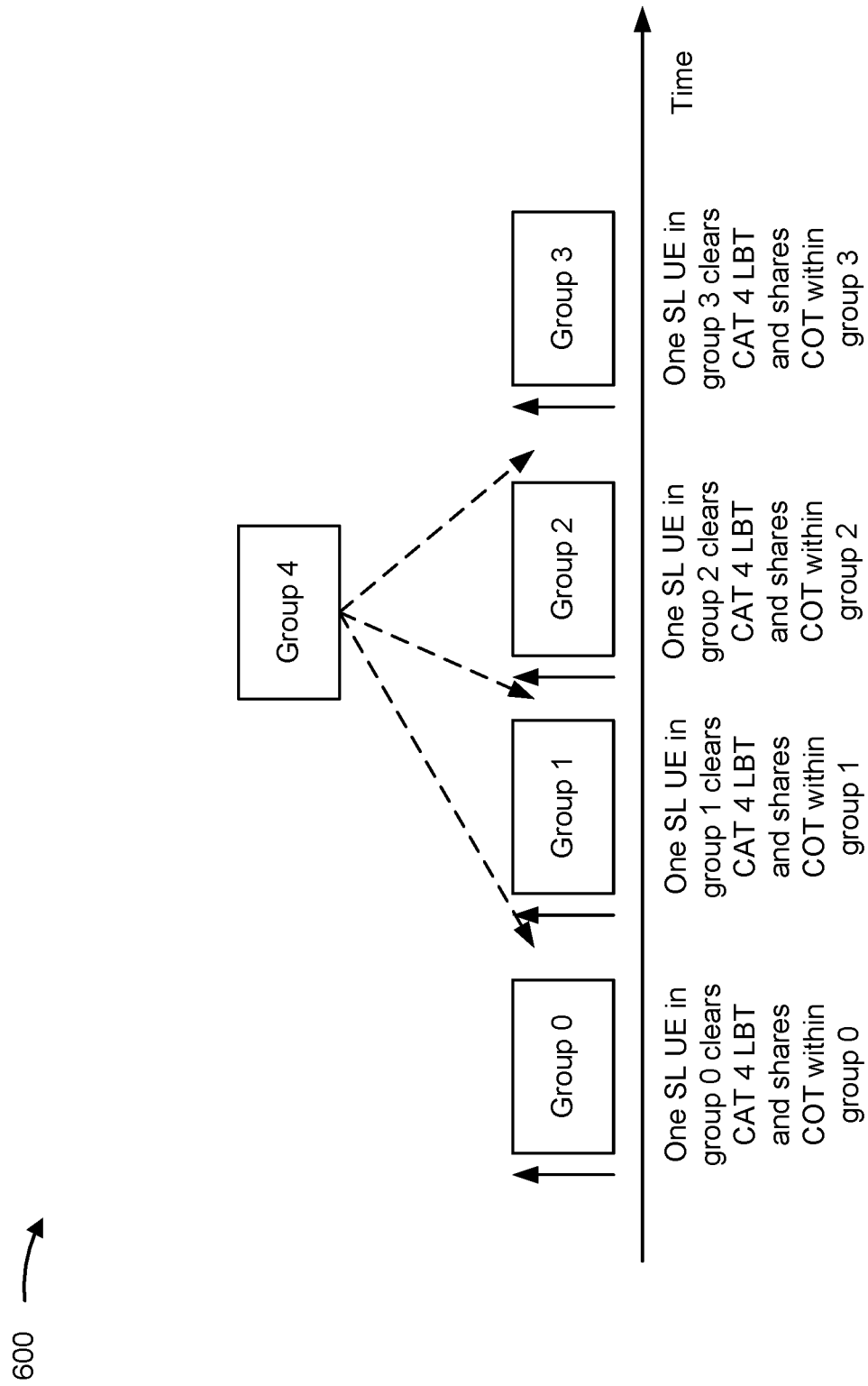
FIG. 6 is a diagram illustrating an example of groups of sidelink UEs configured for group channel occupancy time (COT) sharing, in accordance with various aspects of the present disclosure.

FIG. 6 is a diagram illustrating an example 600 of groups of sidelink UEs configured for group COT sharing, in accordance with various aspects of the present disclosure.

Large groups of sidelink UEs may be more likely to clear an LBT procedure, such as a CAT 4 LBT, which may allow one of the sidelink UEs in the group to obtain access to the available channel and share a COT associated with the channel with other sidelink UEs in the group. Large groups of sidelink UEs may be more likely to clear an LBT procedure as compared to groups of sidelink UEs with fewer numbers of sidelink UEs. Groups of sidelink UEs with fewer numbers of sidelink UEs may be less likely to obtain a group COT. Further, group COT sharing may not allow one group of sidelink UEs to share a COT with another group of sidelink UEs.

In the example shown in FIG. 6, four groups of sidelink UEs (Group 0, Group 1, Group 2, and Group 3) may be formed. Each of the four groups may include a relatively large number of sidelink UEs (e.g., 20 or more sidelink UEs in each group). A fifth group of sidelink UEs (Group 4) may have a relatively small number of sidelink UEs (e.g., two sidelink UEs). The four groups of sidelink UEs with greater numbers of sidelink UEs may each be more likely to clear an LBT procedure and share a COT with other sidelink UEs within their respective groups. The four groups of sidelink UEs may time division multiplex their corresponding group COTs back-to-back, thereby causing the fifth group of sidelink UEs to wait until after the four groups of sidelink UEs are finished with their sidelink transmissions. In other words, the fifth group of sidelink UEs may be unable to clear an LBT procedure until after the four groups of sidelink UEs are finished with their sidelink transmissions.

In situations where the fifth group of sidelink UEs are attempting to transmit time sensitive data or control signaling, such a delay may be unacceptable. When a group COT associated with a group of sidelink UEs is relatively long (e.g., 6 ms), sidelink UEs in other groups may be unable to deliver time sensitive packets in a timely manner.

Further, the four groups of sidelink UEs, with each group including 20 sidelink UEs, may be transmitting packets with class 2. The fifth group of sidelink UEs, which may include two sidelink UEs, may have time sensitive packets to transmit and hence may select class 4. In this example, the fifth group of sidelink UEs may be associated with higher priority transmissions as compared to the four groups of sidelink UEs. Although the fifth group of sidelink UEs may have a smaller contention window size as compared to the four groups of sidelink UEs (e.g., 3 and 7 versus 15 and 1023, respectively) due to the higher priority, the fifth group of sidelink UEs consisting of two sidelink UEs may be outnumbered by the 20 sidelink UEs included in each of the four groups of sidelink UEs. As a result, the fifth group of sidelink UEs may lose a CAT 4 LBT to the four groups of sidelink UEs, and the fifth group of sidelink UEs may only be able to transmit after the four groups of sidelink UEs. Further, the four groups of sidelink UEs may have sidelink UEs scattered across a larger region as compared to the fifth group of sidelink UEs, and hence a greater LBT diversity.

As an example, Group 0 may select a minimum contention window value of 15. Since Group 0 has 20 sidelink UEs, an average of 20/15 sidelink UEs may select a counter value q=0 as part of the LBT procedure. Group 4 may select a minimum contention window value of 3. Since Group 4 has two sidelink UEs, an average of 2/3 sidelink UEs may select a counter value q=0 as part of the LBT procedure. Since 20/15 is greater than 2/3, Group 0 has a higher likelihood to clear the LBT before Group 4.

As indicated above, FIG. 6 is provided as an example. Other examples may differ from what is described with regard to FIG. 6.

A likelihood of a sidelink UE sensing an available channel for a duration of time and gaining access to the channel may be based at least in part on a contention window size, which may be one parameter of an LBT procedure. With group COT sharing, one sidelink UE that clears the LBT procedure may share a COT with other sidelink UEs in a group, effectively making the COT a group COT that is shared with the other sidelink UEs. Large groups of sidelink UEs may have an advantage over smaller groups of sidelink UEs in clearing the LBT procedure and sharing a COT with other sidelink UEs in the group.

In various aspects of techniques and apparatuses described herein, a sidelink UE may determine an adjusted contention window size for an LBT procedure that increases channel access time fairness between different groups of sidelink UEs. The adjusted contention window size may allow fairness of medium access time for the different groups of sidelink UEs. The adjusted contention window size may be based at least in part on a minimum adjusted contention window value and a maximum adjusted contention window value. By adjusting a contention window size based on a variety of factors, smaller groups of sidelink UEs may not have an unfair disadvantage with respect to larger groups of sidelink UEs when performing LBT to obtain access to an available channel.

In various aspects of techniques and apparatuses described herein, the sidelink UE may determine the adjusted contention window size based at least in part on a quantity of sidelink UEs included in the group of sidelink UEs. In some aspects, the sidelink UE may determine the adjusted contention window size based at least in part on an area associated with the group of sidelink UEs. The sidelink UE may determine the adjusted contention window size based at least in part on an amount of shareable time-frequency COT resources. In some aspects, the sidelink UE may determine the adjusted contention window size based at least in part on an amount of unused shareable time-frequency COT resources. In some aspects, the sidelink UE may determine the adjusted contention window size based at least in part on the sidelink UE successfully performing a sidelink transmission on shareable time-frequency resources associated with the group of sidelink UEs.

In various aspects of techniques and apparatuses described herein, the sidelink UE may determine, via the LBT procedure, that a channel is idle based at least in part on the adjusted contention window size. The sidelink UE may transmit, to other sidelink UEs in a group of sidelink UEs, SCI that enables a group COT associated with the channel to be shared with the other sidelink UEs in the group of sidelink UEs.

Figure 7:
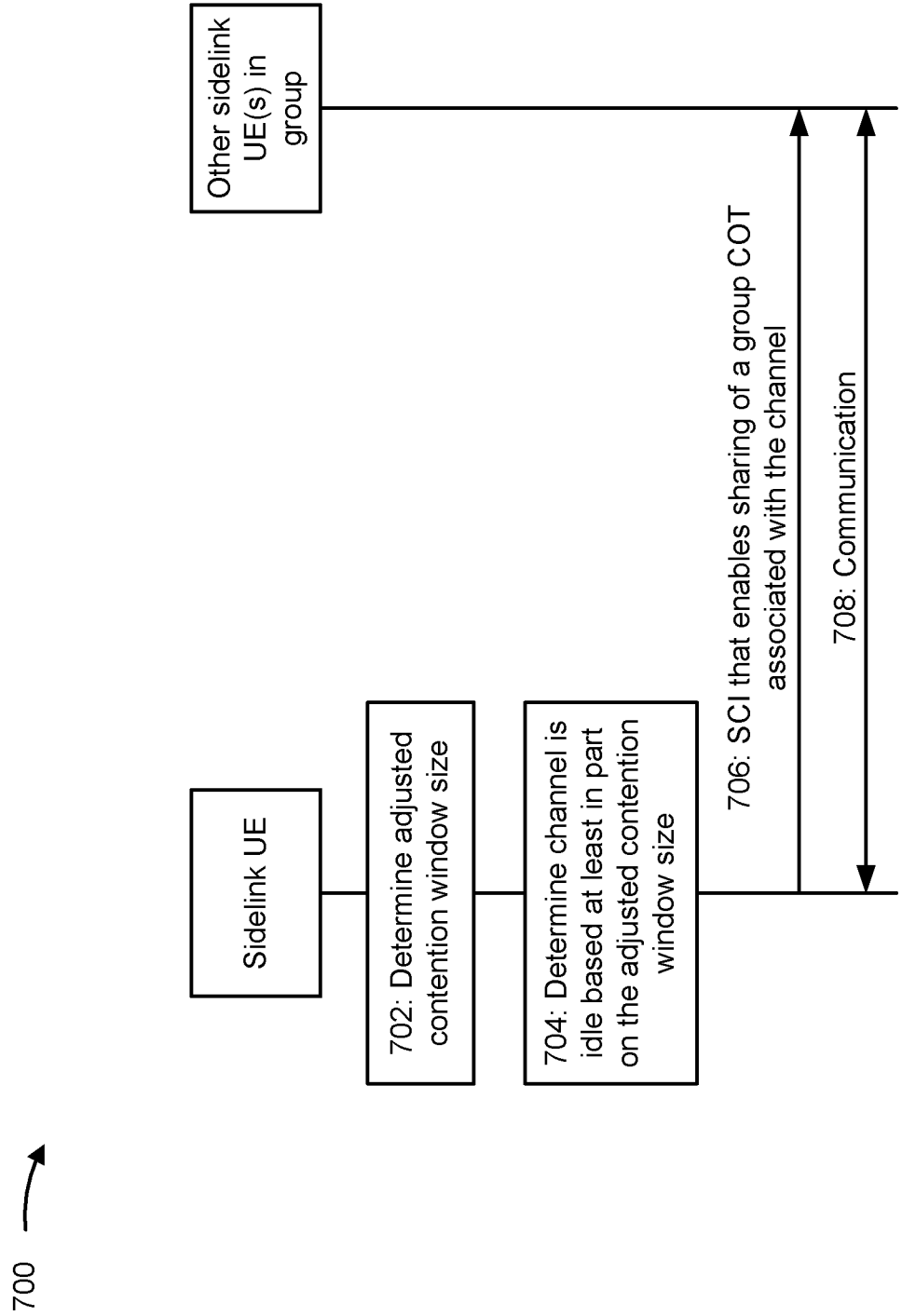
FIG. 7 is a diagram illustrating an example associated with contention window adjustment for group COT sharing, in accordance with various aspects of the present disclosure.

FIG. 7 is a diagram illustrating an example 700 associated with contention window adjustment for group COT sharing, in accordance with various aspects of the present disclosure. As shown in FIG. 7, example 700 includes communication between a sidelink UE (e.g., UE 120a) and other sidelink UEs (e.g., UE 120e) in a group of sidelink UEs. In some aspects, the sidelink UEs may be included in a wireless network such as wireless network 100. The sidelink UEs may communicate on a wireless sidelink.

In some aspects, the sidelink UE may be included in the group of sidelink UEs, where the sidelink UE may be configured to share a group COT with the other sidelink UEs in the group.

As shown by reference number 702, the sidelink UE may determine an adjusted contention window size for an LBT procedure that increases channel access time fairness between different groups of sidelink UEs. A difference between a likelihood of one group of sidelink UEs obtaining channel access time and a likelihood of another group of sidelink UEs obtaining channel access time may satisfy a threshold, thereby ensuring the channel access time fairness between the different groups of sidelink UEs. The channel access time between the different groups of sidelink UEs may be fair, irrespective of geographic areas associated with the different groups of sidelink UEs, quantities of UEs associated with the different groups of sidelink UEs, etc. The adjusted contention window size may be based at least in part on a minimum adjusted contention window value ($CW_{min}$) and a maximum adjusted contention window value ($CW_{max}$).

In some aspects, the sidelink UE may determine the adjusted contention window size based at least in part on a quantity of sidelink UEs included in the group of sidelink UEs. For example, the sidelink UE may adjust (e.g., scale up or scale down) a contention window size to obtain the adjusted contention window size based at least in part on the quantity of sidelink UEs included in the group of sidelink UEs. The quantity of sidelink UEs included in the group may be based at least in part on a configuration received from a base station.

As an example, in an initial configuration, Group 0 may include 20 sidelink UEs and may initially select a minimum contention window value of 15. Group 4 may include two sidelink UEs and may initially select a minimum contention window value of 3, due to higher priority traffic to be transmitted by sidelink UEs in Group 4. In the initial configuration, since Group 0 has 20 sidelink UEs, average of 20/15 sidelink UEs may select a counter value q=0 as part of the LBT procedure. Since Group 4 has two sidelink UEs, an average of 2/3 sidelink UEs may select a counter value q=0 as part of the LBT procedure. In the initial configuration, since 20/15 is greater than 2/3, Group 0 has a higher likelihood to clear the LBT before Group 4. Now, both Group 0 and Group 4 may scale the minimum contention window value based on the number of sidelink UEs in Group 0 and Group 4, respectively. For example, Group 0 may scale up the minimum contention window value from 15 to 300, which is a factor of 20 based at least in part on the 20 sidelink UEs included in Group 0. Group 4 may scale up the minimum contention window value from 3 to 6, which is a factor of two based at least in part on the two sidelink UEs included in Group 4. As a result, in Group 0, an average of 1/15 sidelink UEs may select a counter value q=0 as part of the LBT procedure, and in Group 4, an average of 1/3 sidelink UEs may select a counter value q=0 as part of the LBT procedure. Since 1/3 is greater than 1/15, Group 4 with the higher priority traffic may have an increased likelihood of clearing the LBT before Group 0.

In some aspects, the sidelink UE may determine the adjusted contention window size based at least in part on an area associated with the group of sidelink UEs. The area may be an RF coverage area. Sidelink UEs in the group may be scattered across the RF coverage area. Since interference may be based at least in part on a distance between sidelink UEs, determining the adjusted contention window size based at least in part on the area may provide greater benefit than determining the adjusted contention window size based at least in part on the quantity of sidelink UEs included in the group of sidelink UEs.

In some aspects, the sidelink UE may determine the RF coverage area associated with the group of sidelink UEs based at least in part on a DMRS signal strength associated with SCI received via a PSCCH from the group of sidelink UEs, and/or a transmit beam width associated with transmitting group sharing COT system information (COT-SI).

The sidelink UE may apply the adjusted contention window size based at least in part on the estimated RF coverage area for a group COT sharing.

For example, the sidelink UE may be a group COT sharing sidelink UE that initiates a sharing of the group COT, and that estimates the RF coverage area based at least in part on the DMRS signal strength in the SCI(s) (e.g., PSCCH) from the group of sidelink UEs, and/or a transmit beam width for transmitting the group sharing COT-SI. The COT-SI may be included in SCI 0/1 containing a group ID and may enable a listening sidelink UE to determine if the DMRS is from a same sidelink UE group.

As another example, the sidelink UE that initiates the sharing of the group COT may be a half-duplex UE. In this case, the sidelink UE may estimate the RF coverage area at a remaining COT region in which the sidelink UE is in an Rx mode.

In some aspects, the sidelink UE may not initiate the sharing of the group COT. Rather, the sidelink UE may receive SCI from the group COT sharing UE that initiates the sharing and/or other sidelink UEs in the group. The sidelink UE may estimate the DMRS signal strength in the received SCI. The sidelink UE may estimate the RF coverage area based on the DMRS signal strength and determine the adjusted contention window size based at least in part on the estimated RF coverage area. In other words, the sidelink UE that estimates the RF coverage area and determines the adjusted contention window size may not necessarily be the sidelink UE that initiate the sharing of the group COT.

In some aspects, a sidelink UE may obtain a group COT for the group of sidelink UEs, but a size of the group COT may be more than is needed for group traffic associated with the group of sidelink UEs. The sidelink UE may time division multiplex transport blocks back-to-back in one subchannel to block out-of-group sidelink UEs from using subchannels associated with the group COT, while leaving other subchannels for the group traffic. In other words, the sidelink UE may block other groups of sidelink UEs from using the subchannels associated with the group COT, even when the size of the group COT exceeds an amount of group traffic.

In some aspects, the sidelink UE may determine the adjusted contention window size based at least in part on an amount of shareable time-frequency COT resources. The shareable time-frequency resources may be associated with the group COT shared by the group of sidelink UEs. The shareable time-frequency resources may be shareable with other groups of sidelink UEs. As an example, the adjusted contention window size may be greater based at least in part on more time-frequency resources being shared with other groups of UEs, as compared to the adjusted contention window size being less based at least in part on less time-frequency resources being shared with other groups of UEs.

In some aspects, the sidelink UE may determine the adjusted contention window size based at least in part on an amount of unused shareable time-frequency COT resources (e.g., a previous amount of unused shareable time-frequency COT resources). The unused shareable time-frequency resources may be associated with a group COT (e.g., a previous group COT) shared by the group of sidelink UEs. The unused shareable time-frequency resources may be an input for a next group COT sharing contention window size adjustment.

In some aspects, the unused shareable time-frequency resources may be based at least in part on used shareable time-frequency resources. The sidelink UE, which may be a group COT sharing sidelink UE that initiates a sharing of the group COT, may detect the used shareable time-frequency resources. Other sidelink UEs in the group of sidelink UEs may also detect the used shareable time-frequency resources.

In some aspects, the sidelink UE may detect shareable time-frequency resource usage of the group based at least in part on decoding SCIs received from other sidelink, where the SCIs may indicate a group ID associated with the group. The sidelink UE may detect the shareable time-frequency resource usage in a remaining COT region, and while operating in a listen mode. In some aspects, the sidelink UE may detect used shareable time-frequency resources while operating in an Rx mode.

In some aspects, the sidelink UE may be a half-duplex sidelink UE that initiates the sharing of the group COT. In a used COT region, the sidelink UE may not detect SCI while operating in a Tx mode.

In some aspects, the unused shareable time-frequency resources may be based at least in part on unused shareable time-frequency resources in a period that corresponds to an Rx mode of the sidelink UE, and/or an amount of shareable time-frequency resources in a period that corresponds to a Tx mode of the sidelink UE.

In some aspects, a sidelink UE that has previously used shareable time-frequency resources associated with another group of sidelink UEs may be unable to obtain a prolonged COT and share the COT, even when the sidelink only has a few leftover packets to transmit. In other words, since the sidelink UE may have previously piggyback on the shareable time-frequency resources of the other group of sidelink UEs, the sidelink UE may be less likely to clear an LBT later in time.

In some aspects, the sidelink UE may determine the adjusted contention window size based at least in part on the sidelink UE successfully performing a sidelink transmission on shareable time-frequency resources associated with the group of sidelink UEs. The sidelink UE may adjust (e.g., scale up or scale down) a contention window size to obtain the adjusted contention window size, which may be applied for a next group COT sharing with other sidelink UEs in the group of UEs. For example, the sidelink UE that successfully performs the sidelink transmission on the shareable time-frequency resources associated with the other group of sidelink UEs may be less prone to clear a CAT 4 LBT with a scaled up contention window size.

In some aspects, an RRC configured timer may be set up for the adjusted contention window size after the sidelink UE performs the sidelink transmission on the shareable time-frequency resources associated with the other group of sidelink UEs, and the adjusted contention window size may return to a previous contention window size based at least in part on an expiry of the timer.

In some aspects, a contention window size for a regular sidelink transmission without group COT sharing may not be adjusted. In some aspects, the sidelink UE may determine the adjusted contention window size for a COT associated with only the sidelink UE (e.g., a non-group sharing COT), and the adjusted contention window size may be valid for a duration of an RRC configured timer.

In some aspects, the sidelink UE may disable a feature associated with determining the adjusted contention window size based at least in part on a non-detection of other groups of sidelink UEs. The non-detection of the other groups of sidelink UEs may be based at least in part on a non-detection of COT-SI that indicates group COT sharing for another group ID. In other words, the sidelink UE may turn off a contention window size adjustment when no other groups of UEs are in proximity to the sidelink UE. The sidelink UE may turn off a contention window backoff to protect the benefit of group COT sharing in response to not receiving or detecting COT-SI indicating group COT sharing for other group(s) of sidelink UEs.

As shown by reference number 704, the sidelink UE may determine, via an LBT procedure, that a channel is idle based at least in part on the adjusted contention window size. For example, the sidelink UE may perform a CAT 4 LBT procedure and determine that the channel is idle based at least in part on the adjusted contention window size.

As shown by reference number 706, the sidelink UE may transmit SCI to the other sidelink UEs in the group of sidelink UEs. The SCI may enable a group COT associated with the channel to be shared with the other UEs in the group of sidelink UEs. In other words, after the sidelink UE performs the LBT procedure and obtains access to the channel for a COT, the sidelink UE may share the COT with the other UEs in the group of sidelink UEs.

As shown by reference number 708, the sidelink UE and the other sidelink UEs in the group of sidelink UEs may communicate based at least in part on the SCI that enables the group COT associated with the channel to be shared with the other UEs in the group of UEs.

As indicated above, FIG. 7 is provided as an example. Other examples may differ from what is described with regard to FIG. 7.

Figure 8:
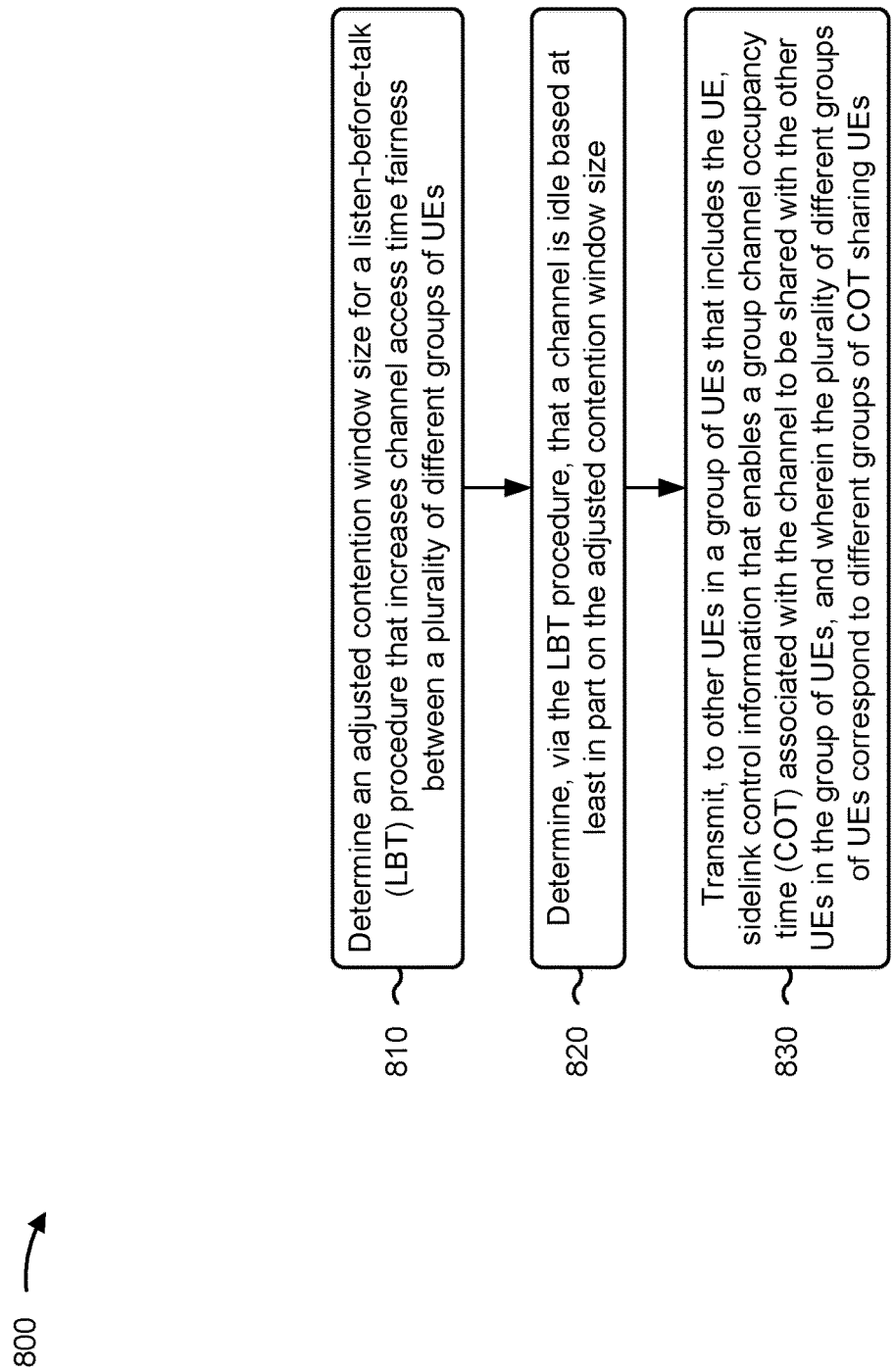
FIG. 8 is a diagram illustrating an example process associated with contention window adjustment for group COT sharing, in accordance with various aspects of the present disclosure.

FIG. 8 is a diagram illustrating an example process 800 performed, for example, by a UE, in accordance with various aspects of the present disclosure. Example process 800 is an example where the UE (e.g., UE 120) performs operations associated with contention window adjustment for group COT sharing.

As shown in FIG. 8, in some aspects, process 800 may include determining an adjusted contention window size for an LBT procedure that increases channel access time fairness between a plurality of different groups of UEs (block 810). For example, the UE (e.g., using determination component 908, depicted in FIG. 9) may determine an adjusted contention window size for an LBT procedure that increases channel access time fairness between a plurality of different groups of UEs, as described above.

As further shown in FIG. 8, in some aspects, process 800 may include determining, via the LBT procedure, that a channel is idle based at least in part on the adjusted contention window size (block 820). For example, the UE (e.g., using determination component 908, depicted in FIG. 9) may determine, via the LBT procedure, that a channel is idle based at least in part on the adjusted contention window size, as described above.

As further shown in FIG. 8, in some aspects, process 800 may include transmitting, to other UEs in a group of UEs that includes the UE, control information that enables a group COT associated with the channel to be shared with the other UEs in the group of UEs, and wherein the plurality of different groups of UEs correspond to different groups of COT sharing UEs (block 830). For example, the UE (e.g., using transmission component 904, depicted in FIG. 9) may transmit, to other UEs in a group of UEs that includes the UE, control information that enables a group COT associated with the channel to be shared with the other UEs in the group of UEs, and wherein the plurality of different groups of UEs correspond to different groups of COT sharing UEs, as described above.

Process 800 may include additional aspects, such as any single aspect or any combination of aspects described below and/or in connection with one or more other processes described elsewhere herein.

In a first aspect, the adjusted contention window size is based at least in part on a minimum adjusted contention window value and a maximum adjusted contention window value.

In a second aspect, alone or in combination with the first aspect, determining the adjusted contention window size comprises determining the adjusted contention window size based at least in part on a quantity of UEs included in the group of UEs.

In a third aspect, alone or in combination with one or more of the first and second aspects, the quantity of UEs included in the group of UEs is based at least in part on a configuration received from a base station.

In a fourth aspect, alone or in combination with one or more of the first through third aspects, determining the adjusted contention window size comprises determining the adjusted contention window size based at least in part on an area associated with the group of UEs.

In a fifth aspect, alone or in combination with one or more of the first through fourth aspects, the area is an RF coverage area, and further comprising determining the RF coverage area associated with the group of UEs based at least in part on one or more of a demodulation reference signal strength associated with control information received via a control channel from the group of UEs, or a transmit beam width associated with transmitting group-sharing COT system information.

In a sixth aspect, alone or in combination with one or more of the first through fifth aspects, the area is an RF coverage area and the UE is a half-duplex UE, and further comprising determining, in a receive mode, the RF coverage area associated with the group of UEs during a remaining group COT region.

In a seventh aspect, alone or in combination with one or more of the first through sixth aspects, determining the adjusted contention window size comprises determining the adjusted contention window size based at least in part on an amount of shareable time-frequency COT resources, and wherein the shareable time-frequency COT resources are configured to be shareable for the UE within the group of UEs.

In an eighth aspect, alone or in combination with one or more of the first through seventh aspects, determining the adjusted contention window size comprises determining the adjusted contention window size based at least in part on determining an amount of unused shareable time-frequency COT resources based at least in part on an amount of used shareable time-frequency COT resources.

In a ninth aspect, alone or in combination with one or more of the first through eighth aspects, determining the adjusted contention window size further comprises determining, while operating in a listen mode, the amount of used shareable time-frequency COT resources in a remaining shared COT region based at least in part on decoding control information received from the other UEs in the group of UEs, and wherein the control information includes an indication of a group identifier associated with the group of UEs.

In a tenth aspect, alone or in combination with one or more of the first through ninth aspects, determining the adjusted contention window size further comprises determining, while operating in a receive mode, the amount of used shareable time-frequency COT resources.

In an eleventh aspect, alone or in combination with one or more of the first through tenth aspects, the amount of unused shareable time-frequency COT resources is based at least in part on an amount of unused shareable time-frequency COT resources during a period that corresponds to a receive mode of the UE, and an amount of shareable time-frequency COT resources during a period that corresponds to a transmission mode of the UE.

In a twelfth aspect, alone or in combination with one or more of the first through eleventh aspects, determining the adjusted contention window size comprises determining the adjusted contention window size based at least in part on the UE successfully performing a transmission on shareable time-frequency resources associated with the group of UEs.

In a thirteenth aspect, alone or in combination with one or more of the first through twelfth aspects, the adjusted contention window size is valid for a duration of a timer received via a radio resource control configuration, and further comprising reverting the adjusted contention window size to a previous contention window size based at least in part on an expiry of the timer.

In a fourteenth aspect, alone or in combination with one or more of the first through thirteenth aspects, process 800 includes disabling a feature associated with determining the adjusted contention window size based at least in part on a non-detection of other groups of UEs, and wherein the non-detection of the other groups of UEs is based at least in part on a non-detection of COT system information that indicates group COT sharing for another group identifier.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
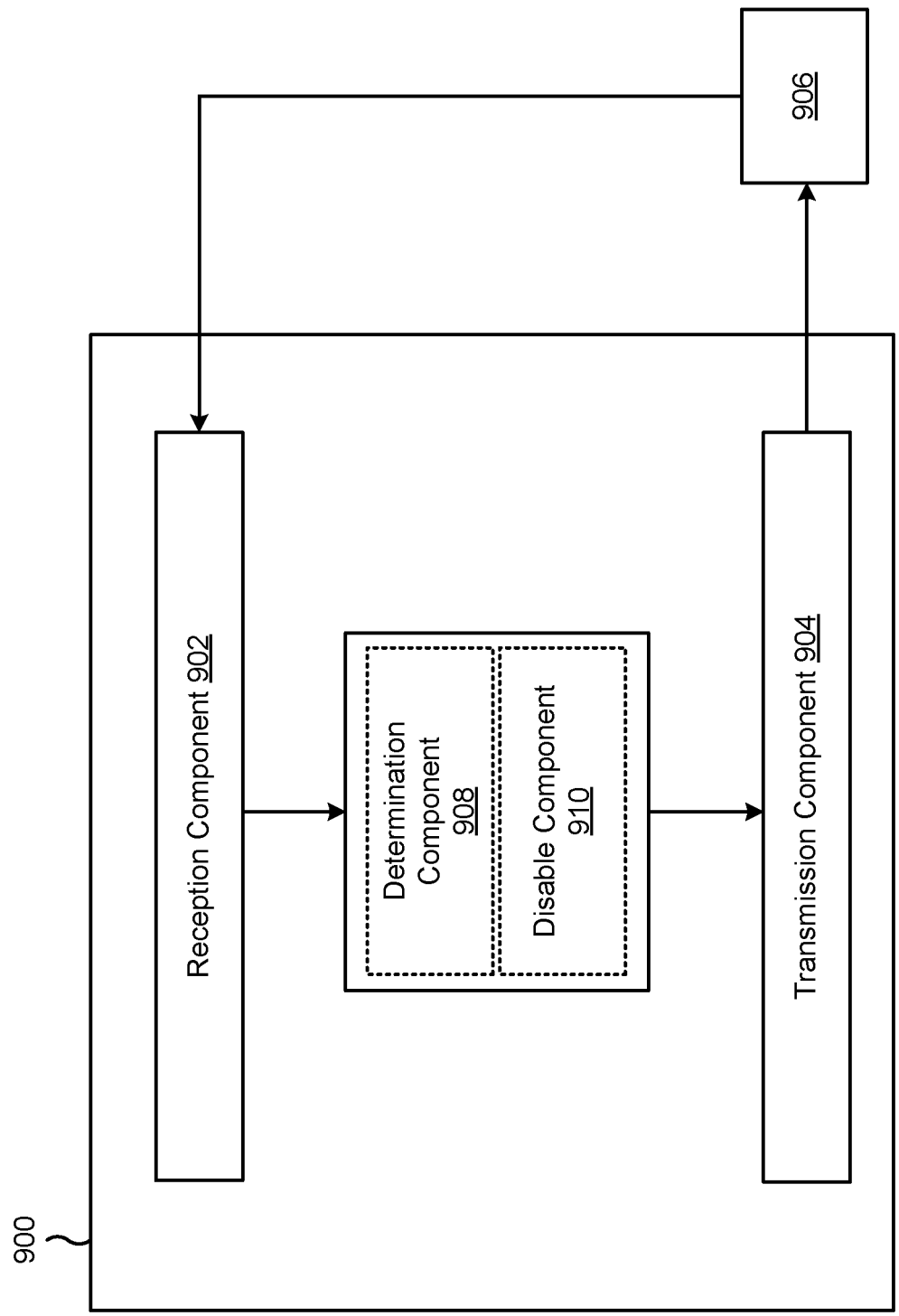
FIG. 9 is a block diagram of an example apparatus for wireless communication, in accordance with various aspects of the present disclosure.

FIG. 9 is a block diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include one or more of a determination component 908, or a disable component 910, among other examples.

In some aspects, the apparatus 900 may be configured to perform one or more operations described herein in connection with FIG. 7. Additionally, or alternatively, the apparatus 900 may be configured to perform one or more processes described herein, such as process 800 of FIG. 8. In some aspects, the apparatus 900 and/or one or more components shown in FIG. 9 may include one or more components of the UE described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the UE described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the UE described above in connection with FIG. 2. In some aspects, the transmission component 904 may be co-located with the reception component 902 in a transceiver.

The determination component 908 may determine an adjusted contention window size for an LBT procedure that increases channel access time fairness between a plurality of different groups of UEs. The determination component 908 may determine, via the LBT procedure, that a channel is idle based at least in part on the adjusted contention window size. The transmission component 904 may transmit, to other UEs in a group of UEs that includes the UE, control information that enables a group COT associated with the channel to be shared with the other UEs in the group of UEs.

The determination component 908 may determine the adjusted contention window size based at least in part on a quantity of UEs included in the group of UEs.

The determination component 908 may determine the adjusted contention window size based at least in part on an area associated with the group of UEs.

The determination component 908 may determine an RF coverage area associated with the group of UEs based at least in part on one or more of: a demodulation reference signal strength associated with control information received via a control channel from the group of UEs, or a transmit beam width associated with transmitting group-sharing COT system information.

The determination component 908 may determine, in a receive mode, the RF coverage area associated with the group of UEs during a remaining group COT region.

The determination component 908 may determine the adjusted contention window size based at least in part on an amount of shareable time-frequency COT resources, and wherein the shareable time-frequency COT resources are configured to be shareable for the UE within the group of UEs.

The determination component 908 may determine the adjusted contention window size based at least in part on determining an amount of unused shareable time-frequency COT resources based at least in part on an amount of used shareable time-frequency COT resources.

The determination component 908 may determine, while operating in a listen mode, the amount of used shareable time-frequency COT resources in a remaining shared COT region based at least in part on decoding control information received from the other UEs in the group of UEs, wherein the control information includes an indication of a group identifier associated with the group of UEs.

The determination component 908 may determine, while operating in a receive mode, the amount of used shareable time-frequency COT resources.

The determination component 908 may determine the adjusted contention window size based at least in part on the UE successfully performing a transmission on shareable time-frequency resources associated with the group of UEs.

The disable component 910 may disable a feature associated with determining the adjusted contention window size based at least in part on a non-detection of other groups of UEs, wherein the non-detection of the other groups of UEs is based at least in part on a non-detection of COT system information that indicates group COT sharing for another group identifier.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
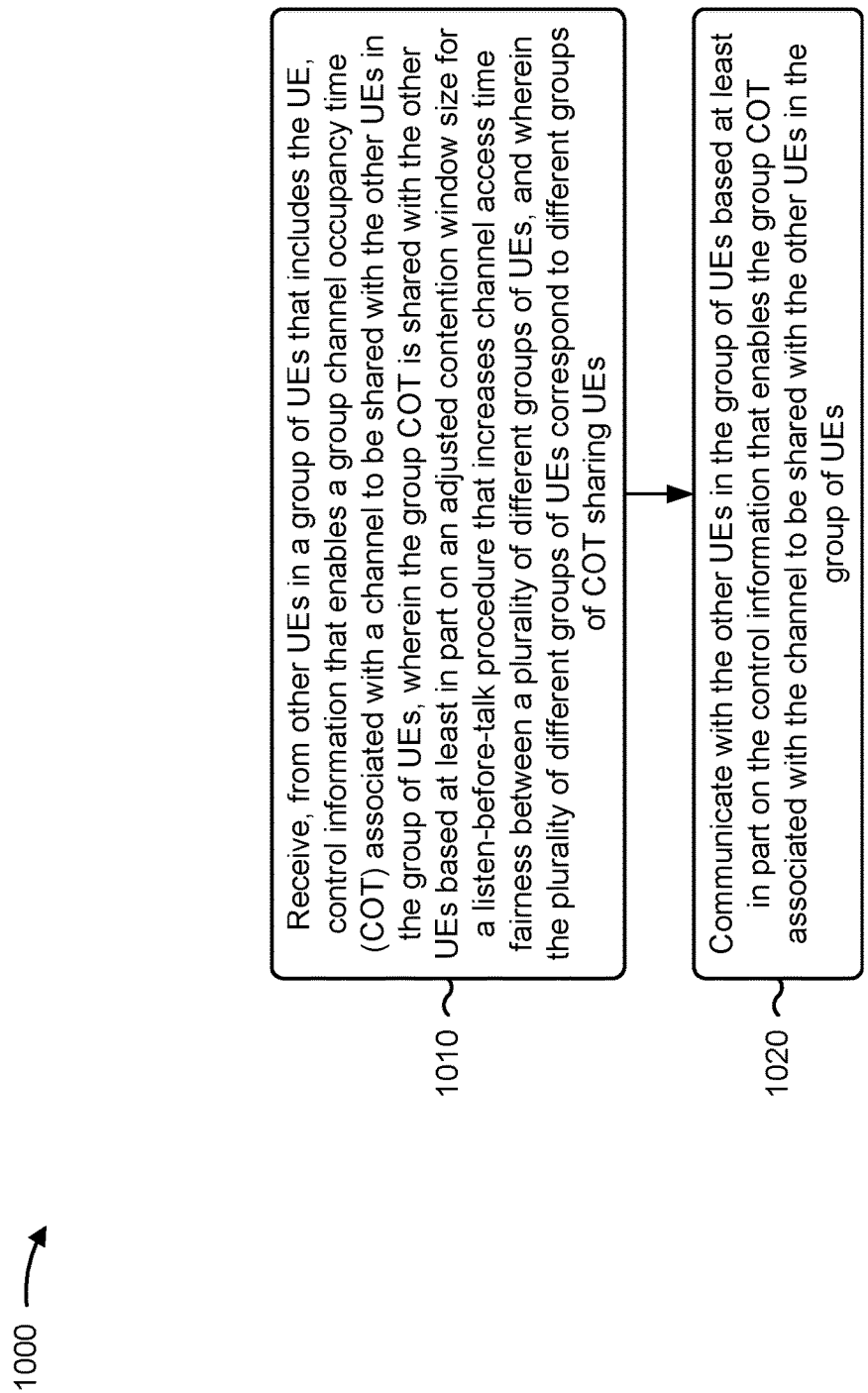
FIG. 10 is a diagram illustrating an example process associated with contention window adjustment for group COT sharing, in accordance with various aspects of the present disclosure.

FIG. 10 is a diagram illustrating an example process 1000 performed, for example, by a UE, in accordance with various aspects of the present disclosure. Example process 1000 is an example where the UE (e.g., UE 120) performs operations associated with contention window adjustment for group COT sharing.

As shown in FIG. 10, in some aspects, process 1000 may include receiving, from other UEs in a group of UEs that includes the UE, control information that enables a group COT associated with a channel to be shared with the other UEs in the group of UEs, wherein the group COT is shared with the other UEs based at least in part on an adjusted contention window size for a listen-before-talk procedure that increases channel access time fairness between a plurality of different groups of UEs, and wherein the plurality of different groups of UEs correspond to different groups of COT sharing UEs (block 1010). For example, the UE (e.g., using reception component 1102, depicted in FIG. 11) may receive, from other UEs in a group of UEs that includes the UE, control information that enables a group COT associated with a channel to be shared with the other UEs in the group of UEs, wherein the group COT is shared with the other UEs based at least in part on an adjusted contention window size for a listen-before-talk procedure that increases channel access time fairness between a plurality of different groups of UEs, and wherein the plurality of different groups of UEs correspond to different groups of COT sharing UEs, as described above.

As further shown in FIG. 10, in some aspects, process 1000 may include communicating with the other UEs in the group of UEs based at least in part on the control information that enables the group COT associated with the channel to be shared with the other UEs in the group of UEs (block 1020). For example, the UE (e.g., using reception component 1102 and/or transmission component 1104, depicted in FIG. 11) may communicate with the other UEs in the group of UEs based at least in part on the control information that enables the group COT associated with the channel to be shared with the other UEs in the group of UEs, as described above.

Process 1000 may include additional aspects, such as any single aspect or any combination of aspects described below and/or in connection with one or more other processes described elsewhere herein.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
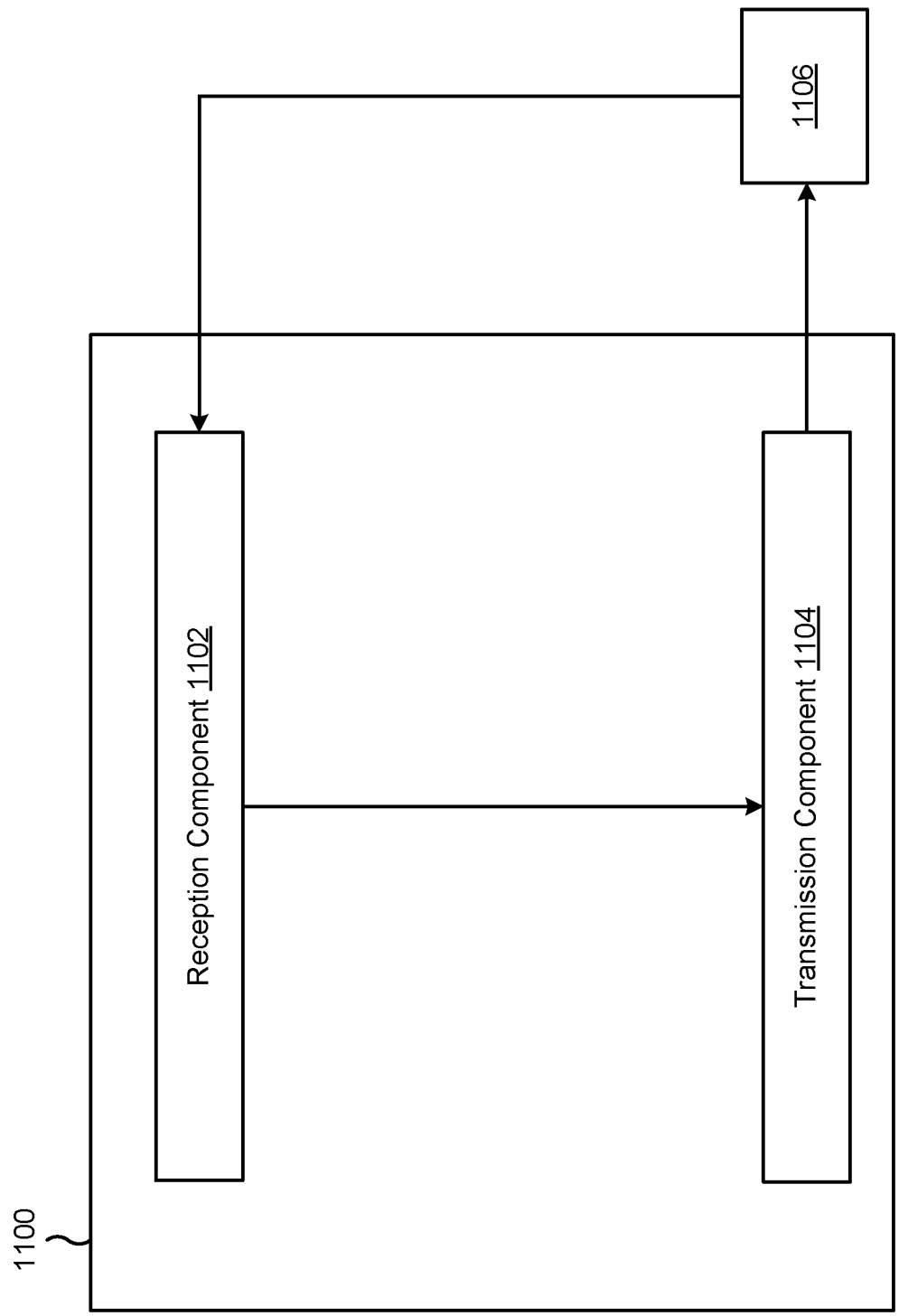
FIG. 11 is a block diagram of an example apparatus for wireless communication, in accordance with various aspects of the present disclosure.

FIG. 11 is a block diagram of an example apparatus 1100 for wireless communication. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104.

In some aspects, the apparatus 1100 may be configured to perform one or more operations described herein in connection with FIG. 7. Additionally, or alternatively, the apparatus 1100 may be configured to perform one or more processes described herein, such as process 1000 of FIG. 10. In some aspects, the apparatus 1100 and/or one or more components shown in FIG. 11 may include one or more components of the UE described above in connection with FIG. 2. Additionally, or alternatively, one or more components shown in FIG. 11 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a demodulator, a MIMO detector, a receive processor, a controller/processor, a memory, or a combination thereof, of the UE described above in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the UE described above in connection with FIG. 2. In some aspects, the transmission component 1104 may be co-located with the reception component 1102 in a transceiver.

The reception component 1102 may receive, from other UEs in a group of UEs that includes the UE, control information that enables a group channel occupancy time (COT) associated with a channel to be shared with the other UEs in the group of UEs, wherein the group COT is shared with the other UEs based at least in part on an adjusted contention window size for a listen-before-talk procedure that increases channel access time fairness between a plurality of different groups of UEs, and wherein the plurality of different groups of UEs correspond to different groups of COT sharing UEs. The reception component 1102 and/or the transmission component 1104 may communicate with the other UEs in the group of UEs based at least in part on the control information that enables the group COT associated with the channel to be shared with the other UEs in the group of UEs.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some aspects of the present disclosure:

Aspect 1: A method of wireless communication performed by a user equipment (UE), comprising: determining an adjusted contention window size for a listen-before-talk (LBT) procedure that increases channel access time fairness between a plurality of different groups of UEs; determining, via the LBT procedure, that a channel is idle based at least in part on the adjusted contention window size; and transmitting, to other UEs in a group of UEs that includes the UE, control information that enables a group channel occupancy time (COT) associated with the channel to be shared with the other UEs in the group of UEs, and wherein the plurality of different groups of UEs correspond to different groups of COT sharing UEs.

Aspect 2: The method of aspect 1, wherein the adjusted contention window size is based at least in part on a minimum adjusted contention window value and a maximum adjusted contention window value.

Aspect 3: The method of any of aspects 1 through 2, wherein determining the adjusted contention window size comprises determining the adjusted contention window size based at least in part on a quantity of UEs included in the group of UEs.

Aspect 4: The method of aspect 3, wherein the quantity of UEs included in the group of UEs is based at least in part on a configuration received from a base station.

Aspect 5: The method of any of aspects 1 through 4, wherein determining the adjusted contention window size comprises determining the adjusted contention window size based at least in part on an area associated with the group of UEs.

Aspect 6: The method of aspect 5, wherein the area is a radio frequency (RF) coverage area, and further comprising: determining the RF coverage area associated with the group of UEs based at least in part on one or more of: a demodulation reference signal strength associated with control information received via a control channel from the group of UEs, or a transmit beam width associated with transmitting group-sharing COT system information.

Aspect 7: The method of any of aspects 5 through 6, wherein the area is a radio frequency (RF) coverage area and the UE is a half-duplex UE, and further comprising: determining, in a receive mode, the RF coverage area associated with the group of UEs during a remaining group COT region.

Aspect 8: The method of any of aspects 1 through 7, wherein determining the adjusted contention window size comprises determining the adjusted contention window size based at least in part on an amount of shareable time-frequency COT resources, and wherein the shareable time-frequency COT resources are configured to be shareable for the UE within the group of UEs.

Aspect 9: The method of any of aspects 1 through 8, wherein determining the adjusted contention window size comprises determining the adjusted contention window size based at least in part on determining an amount of unused shareable time-frequency COT resources based at least in part on an amount of used shareable time-frequency COT resources.

Aspect 10: The method of aspect 9, wherein determining the adjusted contention window size further comprises: determining, while operating in a listen mode, the amount of used shareable time-frequency COT resources in a remaining shared COT region based at least in part on decoding control information received from the other UEs in the group of UEs, wherein the control information includes an indication of a group identifier associated with the group of UEs.

Aspect 11: The method of any of aspects 9 through 10, wherein determining the adjusted contention window size further comprises: determining, while operating in a receive mode, the amount of used shareable time-frequency COT resources.

Aspect 12: The method of any of aspects 9 through 11, wherein the amount of unused shareable time-frequency COT resources is based at least in part on: an amount of unused shareable time-frequency COT resources during a period that corresponds to a receive mode of the UE, and an amount of shareable time-frequency COT resources during a period that corresponds to a transmission mode of the UE.

Aspect 13: The method of any of aspects 1 through 12, wherein determining the adjusted contention window size comprises determining the adjusted contention window size based at least in part on the UE successfully performing a transmission on shareable time-frequency resources associated with the group of UEs.

Aspect 14: The method of aspect 13, wherein the adjusted contention window size is valid for a duration of a timer received via a radio resource control configuration, and further comprising reverting the adjusted contention window size to a previous contention window size based at least in part on an expiry of the timer.

Aspect 15: The method of any of aspects 1 through 14, further comprising: disabling a feature associated with determining the adjusted contention window size based at least in part on a non-detection of other groups of UEs, wherein the non-detection of the other groups of UEs is based at least in part on a non-detection of COT system information that indicates group COT sharing for another group identifier.

Aspect 16: An apparatus for wireless communication at a device, comprising a processor; memory coupled with the processor; and instructions stored in the memory and executable by the processor to cause the apparatus to perform the method of one or more aspects of aspects 1-15.

Aspect 17: A device for wireless communication, comprising a memory and one or more processors coupled to the memory, the memory and the one or more processors configured to perform the method of one or more aspects of aspects 1-15.

Aspect 18: An apparatus for wireless communication, comprising at least one means for performing the method of one or more aspects of aspects 1-15.

Aspect 19: A non-transitory computer-readable medium storing code for wireless communication, the code comprising instructions executable by a processor to perform the method of one or more aspects of aspects 1-15.

Aspect 20: A non-transitory computer-readable medium storing a set of instructions for wireless communication, the set of instructions comprising one or more instructions that, when executed by one or more processors of a device, cause the device to perform the method of one or more aspects of aspects 1-15.

Aspect 21: A method of wireless communication performed by a user equipment (UE), comprising: receiving, from other UEs in a group of UEs that includes the UE, control information that enables a group channel occupancy time (COT) associated with a channel to be shared with the other UEs in the group of UEs, wherein the group COT is shared with the other UEs based at least in part on an adjusted contention window size for a listen-before-talk procedure that increases channel access time fairness between a plurality of different groups of UEs, and wherein the plurality of different groups of UEs correspond to different groups of COT sharing UEs; and communicating with the other UEs in the group of UEs based at least in part on the control information that enables the group COT associated with the channel to be shared with the other UEs in the group of UEs.

Aspect 22: An apparatus for wireless communication at a device, comprising a processor; memory coupled with the processor; and instructions stored in the memory and executable by the processor to cause the apparatus to perform the method of aspect 21.

Aspect 23: A device for wireless communication, comprising a memory and one or more processors coupled to the memory, the memory and the one or more processors configured to perform the method of aspect 21.

Aspect 24: An apparatus for wireless communication, comprising at least one means for performing the method of aspect 21.

Aspect 25: A non-transitory computer-readable medium storing code for wireless communication, the code comprising instructions executable by a processor to perform the method of aspect 21.

Aspect 26: A non-transitory computer-readable medium storing a set of instructions for wireless communication, the set of instructions comprising one or more instructions that, when executed by one or more processors of a device, cause the device to perform the method of aspect 21.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
    a memory; and
    one or more processors operatively coupled to the memory, the one or more processors configured to:
        determine, based at least in part on an amount of unused shareable time-frequency channel occupancy time (COT) resources, an adjusted contention window size for a listen-before-talk (LBT) procedure that increases channel access time fairness between a plurality of different groups of UEs;
        determine, via the LBT procedure, that a channel is idle based at least in part on the adjusted contention window size; and
        transmit, to other UEs in a group of UEs that includes the UE, control information that enables a group COT associated with the channel to be shared with the other UEs in the group of UEs, and wherein the plurality of different groups of UEs correspond to different groups of COT sharing UEs.

2. The UE of claim 1, wherein the adjusted contention window size is further based at least in part on a minimum adjusted contention window value and a maximum adjusted contention window value.

3. The UE of claim 1, wherein the adjusted contention window size is determined further based at least in part on a quantity of UEs included in the group of UEs.

4. The UE of claim 3, wherein the quantity of UEs included in the group of UEs is based at least in part on a configuration received from a base station.

5. The UE of claim 1, wherein the adjusted contention window size is determined further based at least in part on an area associated with the group of UEs.

6. The UE of claim 5, wherein the area is a radio frequency (RF) coverage area, and
    wherein the one or more processors are further configured to:
        determine the RF coverage area associated with the group of UEs based at least in part on one or more of: a demodulation reference signal strength associated with control information received via a control channel from the group of UEs, or a transmit beam width associated with transmitting group-sharing COT system information.

7. The UE of claim 5, wherein the area is a radio frequency (RF) coverage area and the UE is a half-duplex UE, and
    wherein the one or more processors are further configured to:

determine, in a receive mode of the UE, the RF coverage area associated with the group of UEs during a remaining group COT region.

8. The UE of claim 1, wherein the shareable time-frequency COT resources are configured to be shareable within the group of UEs.

9. The UE of claim 1, wherein the amount of unused shareable time-frequency COT resources is based at least in part on an amount of used shareable time-frequency COT resources.

10. The UE of claim 9,
wherein the one or more processors are further configured to:
determine, while operating in a listen mode of the UE, the amount of used shareable time-frequency COT resources in a remaining shared COT region based at least in part on decoding control information received from the other UEs, and
wherein the control information includes an indication of a group identifier associated with the group of UEs.

11. The UE of claim 9, wherein the one or more processors are further configured to:
determine, while operating in a receive mode of the UE, the amount of used shareable time-frequency COT resources.

12. The UE of claim 9, wherein the amount of unused shareable time-frequency COT resources is based at least in part on:
an amount of unused shareable time-frequency COT resources during a period that corresponds to a receive mode of the UE, and
an amount of shareable time-frequency COT resources during a period that corresponds to a transmission mode of the sidelink UE.

13. The UE of claim 1, wherein the adjusted contention window size is determined further based at least in part on the UE successfully performing a transmission on shareable time-frequency resources associated with the group of UEs.

14. The UE of claim 13, wherein the adjusted contention window size is valid for a duration of a timer received via a radio resource control configuration, and
wherein the one or more processors are further configured to:
revert the adjusted contention window size to a previous contention window size based at least in part on an expiry of the timer.

15. The UE of claim 1,
wherein the one or more processors are further configured to:
disable a feature associated with determining the adjusted contention window size based at least in part on a non-detection of other groups of UEs, and
wherein the non-detection of the other groups of UEs is based at least in part on a non-detection of COT system information that indicates group COT sharing for another group identifier.

16. A method of wireless communication performed by a user equipment (UE), comprising:
determining, based at least in part on an amount of unused shareable time-frequency channel occupancy time (COT) resources, an adjusted contention window size for a listen-before-talk (LBT) procedure that increases channel access time fairness between a plurality of different groups of UEs;
determining, via the LBT procedure, that a channel is idle based at least in part on the adjusted contention window size; and
transmitting, to other UEs in a group of UEs that includes the UE, control information that enables a group COT associated with the channel to be shared with the other UEs in the group of UEs, and wherein the plurality of different groups of UEs correspond to different groups of COT sharing UEs.

17. The method of claim 16, wherein the adjusted contention window size is further based at least in part on a minimum adjusted contention window value and a maximum adjusted contention window value.

18. The method of claim 16, wherein the adjusted contention window size is determined further based at least in part on a quantity of UEs included in the group of UEs.

19. The method of claim 18, wherein the quantity of UEs included in the group of UEs is based at least in part on a configuration received from a base station.

20. The method of claim 16, wherein the adjusted contention window size is determined further based at least in part on an area associated with the group of UEs.

21. The method of claim 20, wherein the area is a radio frequency (RF) coverage area, and
wherein the method further comprises:
determining the RF coverage area associated with the group of UEs based at least in part on one or more of:
a demodulation reference signal strength associated with control information received via a control channel from the group of UEs, or
a transmit beam width associated with transmitting group-sharing COT system information.

22. The method of claim 20, wherein the area is a radio frequency (RF) coverage area and the UE is a half-duplex UE, and
wherein the method further comprises:
determining, in a receive mode, the RF coverage area associated with the group of UEs during a remaining group COT region.

23. The method of claim 16, wherein the shareable time-frequency COT resources are configured to be shareable for the UE within the group of UEs.

24. The method of claim 16, further comprising:
determining the amount of unused shareable time-frequency COT resources based at least in part on an amount of used shareable time-frequency COT resources.

25. The method of claim 24, further comprising:
determining, while operating in a listen mode, the amount of used shareable time-frequency COT resources in a remaining shared COT region based at least in part on decoding control information received from the other UEs, wherein the control information includes an indication of a group identifier associated with the group of UEs.

26. The method of claim 24, further comprising:
determining, while operating in a receive mode, the amount of used shareable time-frequency COT resources.

27. The method of claim 24, wherein the amount of unused shareable time-frequency COT resources is based at least in part on:
an amount of unused shareable time-frequency COT resources during a period that corresponds to a receive mode of the UE, and
an amount of shareable time-frequency COT resources during a period that corresponds to a transmission mode of the UE.

28. The method of claim 16, wherein the adjusted contention window size is determined further based at least in part on the UE successfully performing a transmission on shareable time-frequency resources associated with the group of UEs.

29. A user equipment (UE) for wireless communication, comprising:
a memory; and
one or more processors operatively coupled to the memory, the one or more processors configured to:
receive, from other UEs in a group of UEs that includes the UE, control information that enables a group channel occupancy time (COT) associated with a channel to be shared with the other UEs in the group of UEs, wherein the group COT is shared with the other UEs based at least in part on an adjusted contention window size for a listen-before-talk procedure that increases channel access time fairness between a plurality of different groups of UEs, wherein the adjusted contention window size is based at least in part on an amount of unused shareable time-frequency channel occupancy time (COT) resources, and wherein the plurality of different groups of UEs correspond to different groups of COT sharing UEs; and
communicate with the other UEs in the group of UEs based at least in part on the control information that enables the group COT associated with the channel to be shared with the other UEs in the group of UEs.

30. A method of wireless communication performed by a user equipment (UE), comprising:
receiving, from other UEs in a group of UEs that includes the UE, control information that enables a group channel occupancy time (COT) associated with a channel to be shared with the other UEs in the group of UEs, wherein the group COT is shared with the other UEs based at least in part on an adjusted contention window size for a listen-before-talk procedure that increases channel access time fairness between a plurality of different groups of UEs, wherein the adjusted contention window size is based at least in part on an amount of unused shareable time-frequency channel occupancy time (COT) resources, and wherein the plurality of different groups of UEs correspond to different groups of COT sharing UEs; and
communicating with the other UEs in the group of UEs based at least in part on the control information that enables the group COT associated with the channel to be shared with the other UEs in the group of UEs.

* * * * *